US009738195B2

(12) United States Patent
Willis

(10) Patent No.: US 9,738,195 B2
(45) Date of Patent: Aug. 22, 2017

(54) AUTOMOTIVE CENTER CONSOLE ARMREST STORAGE BOX LID PROTECTOR

(71) Applicant: David John Willis, Fort Lauderdale, FL (US)

(72) Inventor: David John Willis, Fort Lauderdale, FL (US)

( * ) Notice: Subject to any disclaimer, the term of this patent is extended or adjusted under 35 U.S.C. 154(b) by 0 days.

(21) Appl. No.: 14/604,042

(22) Filed: Jan. 23, 2015

(65) Prior Publication Data

US 2016/0214519 A1   Jul. 28, 2016

(51) Int. Cl.
*B60N 2/70* (2006.01)
*B60N 2/46* (2006.01)

(52) U.S. Cl.
CPC .......... *B60N 2/7005* (2013.01); *B60N 2/466* (2013.01); *B60N 2/7017* (2013.01)

(58) Field of Classification Search
CPC .... B05D 3/007; B05D 3/12; B65H 2404/521; B65H 2515/34; B65H 35/0033; B65H 35/0073; B65H 37/005; B62D 1/065; B62D 25/14; B64D 2011/0613
USPC ............... 296/37.8, 24.34, 1.09; 297/411.35, 297/188.14, 188.04, 227; 180/90, 69.21
See application file for complete search history.

(56) References Cited

U.S. PATENT DOCUMENTS

| 4,437,704 A * | 3/1984 | Hovsepians | A47C 4/02 297/440.14 |
|---|---|---|---|
| 5,246,269 A * | 9/1993 | DeBoer | B60N 2/4686 297/113 |
| 5,395,161 A * | 3/1995 | Spykerman | B60N 2/46 297/411.2 |
| 5,551,755 A * | 9/1996 | Lindberg | B60N 2/5866 297/113 |
| 6,467,839 B1 * | 10/2002 | Kain | B60N 2/28 248/311.2 |
| 7,686,392 B2 * | 3/2010 | Kenny | B60N 2/6018 297/188.06 |
| 7,989,227 B2 * | 8/2011 | Arai | G06Q 10/06 438/10 |
| 2013/0113251 A1 * | 5/2013 | First | A47C 31/11 297/219.1 |

(Continued)

*Primary Examiner* — Glenn Dayoan
*Assistant Examiner* — Sunsurraye Westbrook
(74) *Attorney, Agent, or Firm* — Daniel S. Polley, P.A.

(57) ABSTRACT

This invention is an Automotive Center Console Armrest Storage Box Lid Protector that is an alternative for replacing the factory installed center console/storage box armrest lid when damaged or to be used to for driving comfort as creates a barrier between the factory installed lid and the under forearm of the driver or passengers forearm. It is designed to be installed over the factory installed lid and is held in place with an elastic band or drawstring sewed on the underside of the fitted fabric piece to keep the fabric protector from slipping. It can be made with or without an added sleeve pocket sewed to the top side as in the sketches. Drivers and passengers that rest their forearm on the center console while driving can have added comfort with this protective cover and also can be used as an alternative to replacing the factory installed hard cover after being damaged from use stains and UV rays. It is installed by opening the lid inserting the protective cover by hand over the factory installed lid.

16 Claims, 1 Drawing Sheet

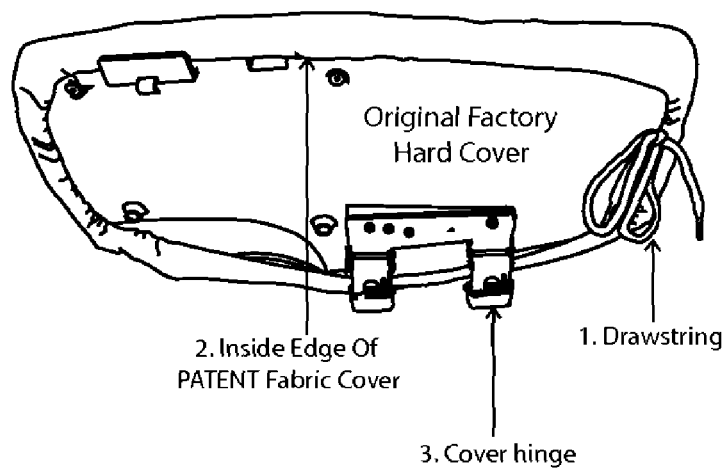

(56) References Cited

U.S. PATENT DOCUMENTS

2013/0147245 A1\* 6/2013 Torres ................ B60N 2/58
  297/227
2013/0328362 A1\* 12/2013 Miller ................ A47C 7/62
  297/188.2

\* cited by examiner

FIGURE 1.
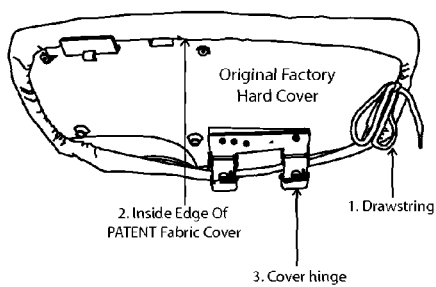
1. Drawstring
2. Inside Edge Of PATENT Fabric Cover
3. Cover hinge
Original Factory Hard Cover FIGURE 2.
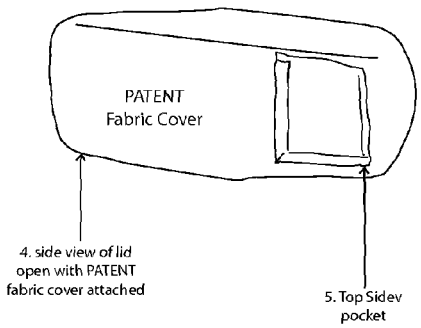
PATENT Fabric Cover
4. side view of lid open with PATENT fabric cover attached
5. Top Sidev pocket FIGURE 3.
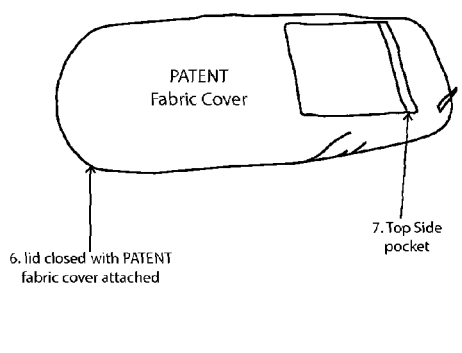
PATENT Fabric Cover
6. lid closed with PATENT fabric cover attached
7. Top Side pocket FIGURE 4.
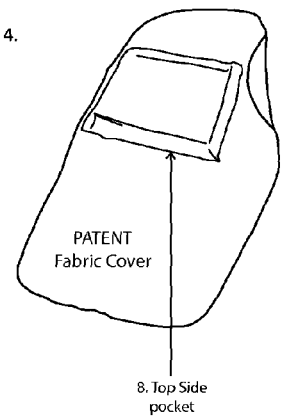
PATENT Fabric Cover
8. Top Side pocket FIGURE 5
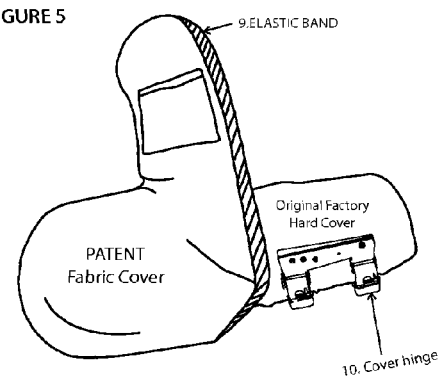
9. ELASTIC BAND
Original Factory Hard Cover
PATENT Fabric Cover
10. Cover hinge

LEGEND

1. Drawstring
2. Inside Edge of PATENT Fabric cover
3. Cover hinge
4. Side view of lid open with PATENT Fabric cover attached
5. Top Side pocket
6. Lid closed with PATENT Fabric cover attached
7. Top Side pocket
8. Top Side pocket
9. Elastic Band
10. Cover hinge
11. Patent Fabric Cover
12. Original factory console lidcover
13. Elastic band FIGURE 6
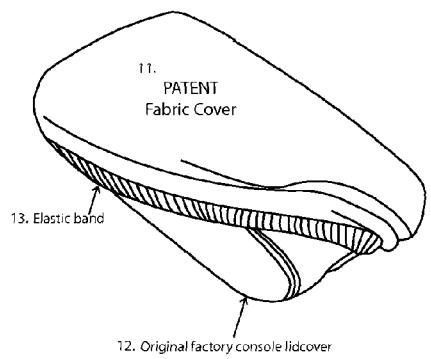
11. PATENT Fabric Cover
13. Elastic band
12. Original factory console lidcover

AUTOMOTIVE CENTER CONSOLE ARMREST STORAGE BOX LID PROTECTOR

And is a cover apparatus/device made of woven or knitted fabric that covers the top of (installed over) the lid of the factory installed automotive center console armrest/storage box lid which is located between the two front bucket seats and keeps the drivers or passengers forearm from coming in direct contact with the factory installed center console armrest/storage box lid.

CROSS-REFERENCE TO RELATED APPLICATIONS

There are no Provisional patent applications claiming priority to and the application is not a continuation.

This invention is not from federally sponsored research.

BACKGROUND OF THE INVENTION

Automotive center console armrest lids that are factory installed are normally made of hard plastic resin based materials or leather/synthetic leather materials. These materials tend to heat up in hot interior vehicle temperatures and are cooled in cold interior vehicle temperatures. Over time they also become stained damaged from perspiration from the occupants forearm resting on the center console lid while in the vehicle from prolonged periods of time and cracked damaged from extreme interior temperature fluxuations, and UV damage from exposure to direct sun light. Also these factory installed lid materials tend to cause the underside of the forearm to perspire from prolonged resting of the driver or the passengers forearm on the center console lid while driving or sitting in the passenger side of the vehicle. This invention is a center console armrest lid COVER that is made of soft absorbent woven or knitted fabric material which creates a barrier between the factory installed center console armrest lid and the driver or passengers forearm. This invention will prolong the life of the factory installed cover by protecting it from extreme temperature changes, direct sun light exposure and staining from occupant forearm perspiration.

SUMMARY OF THE INVENTION

Factory installed automotive center console armrest lids become damaged cracked from UV sunlight, stained from perspiration from occupant resting the forearm on while driving in the vehicle. To replace the factory installed lid would be expensive as is an OEM product and also on older model vehicles the lid itself may not be available as a dealership stock item as most older OEM parts are discontinued. Also the lid may not be available as a single replacement part and purchasing the entire center console may be the only alternative to replacing the lid (cover) itself. This invention would be readily available as a manufactured product.

DESCRIPTION OF THE DRAWINGS

The drawings included in the application consist of sketches of the fabric console lid cover installed on the factory center console armrest lid. Sketches are from side angles, top view looking down, front view looking at the lid cover installed. The sketches also show the console cover installed with the factory console lid bottom side, top side and how the fabric lid cover attaches on the inside with drawstrings or an elastic band that attaches to the underside to keep the protective cover from moving. All parts are numbered to depict the part and listing in a legend describing the part.

DETAILED DESCRIPTION OF THE INVENTION

Automobiles are manufactured with two distinct interior styling. The first is where the transmission shifting lever is mounted on the steering column next to the steering wheel. The drivers and passenger bucket seats have factory installed armrests attached to the sides of the seats to make driving comfort in resting ones arm while driving. These armrests can slide up and out of the way when not in use and also slide down to rest the occupants arm on while driving and the passengers arm while sitting.

The second interior styling description below is where the idea and need of this invention was devised as the console lid surface area is large.

Many factory installed bucket seats do not have a factory installed armrests on the sides of the seats. The armrest is located in the middle of the two seats because the transmission shifting lever is located in the center floor of the vehicle, below the dashboard. To make the styling more efficient, automotive designers created a CENTER CONSOLE that is affixed between the two front bucket seats. Since the driver and passenger would need an arm resting area, the center console was created that combined the transmission shifting lever and armrest in one center console unit. The armrest could not be installed on the seats as it would interfere with the driver reaching the shifting lever. The center console armrest located behind the shifting lever also was styled to include a storage compartment under the armrest. The storage compartment under the armrest has a lid that opens and closes. The factory installed lid for the storage compartment is made of a hard plastic resin based materials or leather/synthetic leather materials and both become hot to the touch in summer months causing extreme discomfort on sensitive under forearm skin and will be damaged from UV sunlight and stained from forearm perspiration. Replacing the factory installed armrest lid would be expensive or nonexistent available as a separate piece for older model vehicles. This invention is a devise that would cover (go over) the factory installed storage compartment/armrest lid, comprised of soft absorbent woven or knitted fabric, be ready available as a manufactured product, easily installed and an alternative finding a replacement lid that would cause the same results and again end damaged over time.

No sequence listing needed as the application does not include nucleic acid or amino acid sequences.

BRIEF DESCRIPTION OF FIGURES/DRAWINGS

FIG. 1. This shows the underside of the factory installed hard lid cover with the Patented fabric lid protective cover installed over it.

FIG. 2. This shows the side top side of the factory installed lid cover with the Patented fabric lid protective cover installed over it.

FIG. 3. This shows the top view of the factory installed lid cover with the Patented fabric lid protective cover installed over it.

FIG. 4. This shows angled top view of the factory installed lid cover with the Patented fabric lid protective cover installed over it.

FIG. 5. This shows the top view of the factory installed lid cover with the Patented fabric lid cover lifted up depicting how it is installed also showing the elastic band that holds it in place.

FIG. 6. This shows the side top view of the factory installed lid cover with the Patented fabric lid cover lifted up at one corner depicting how it is fitted on also showing the elastic band that holds it in place.

The invention claimed is:

1. A method for covering a factory installed automotive center console armrest lid ("armrest lid"), the armrest lid having a shape, comprising:
   (a) sewing a cut piece of fabric to form a fabric cover having a shape corresponding to the shape of the armrest lid and having a single opening, the single opening disposed at an open bottom area which creates a bottom edge;
   (b) attaching a piece of elastic or attaching a drawstring along the bottom edge of the fabric cover; and
   (c) installing the fabric cover to the armrest lid by positioning the open bottom area over the armrest lid and inserting an entire top surface of and side surfaces of the armrest lid through the open bottom area such that the entire top surface and side surfaces of the armrest lid are covered by the fabric cover and the bottom edge of the fabric cover is fully and only positioned underneath the armrest lid and adjacent a bottom surface of the armrest lid.

2. The method of claim 1 further comprising the steps of providing elastic along the bottom edge in step (b) such that the elastic helps to maintain the fabric cover in place over the armrest lid.

3. The method of claim 1 further comprising the steps of providing a drawstring along the bottom edge in step (b) and pulling the drawstring tight to help maintain the fabric cover in place over the armrest lid.

4. The method of claim 1 further comprising the step of sewing a piece of material to a portion of a top surface of the fabric cover to form a pocket on the top surface of the fabric cover.

5. The method of claim 1 wherein the piece of fabric is a piece of woven or knitted fabric.

6. The method of claim 1 wherein the piece of fabric is a soft absorbent woven or knitted fabric.

7. The method of claim 1 wherein the armrest lid is a side opening/side pivoting armrest lid.

8. A method for covering a factory installed automotive center console armrest lid ("armrest lid"), the armrest lid having a shape, comprising:
   (a) cutting a piece of woven or knitted fabric and sewing the cut piece of fabric to form a fabric cover having a shape corresponding to the shape of the armrest lid and having a single opening, the single opening disposed at an open bottom area which creates a bottom edge;
   (b) attaching a piece of elastic or attaching a drawstring along the bottom edge of the fabric cover;
   (c) sewing a piece of material to a portion of a top surface of the fabric cover to form a pocket on the top surface of the fabric cover; and
   (d) installing the fabric cover to the armrest lid by positioning the open bottom area over the armrest lid and inserting an entire top surface of and side surfaces of the armrest lid through the open bottom area such that the entire top surface and side surfaces of the armrest lid are fully covered by the fabric cover and the fabric cover extends along a perimeter area of an underside surface of the armrest lid and the bottom edge of the fabric cover is fully and only positioned underneath the armrest lid and adjacent a bottom surface of the armrest lid.

9. The method of claim 8 further comprising the steps of providing elastic along the bottom edge in step (b) such that the elastic helps to maintain the fabric cover in place over the armrest lid.

10. The method of claim 8 further comprising the steps of providing a drawstring along the bottom edge in step (b) and pulling the drawstring tight to help maintain the fabric cover in place over the armrest lid.

11. The method of claim 8 wherein the piece of fabric is a soft absorbent woven or knitted fabric.

12. The method of claim 8 wherein the armrest lid is a side opening/side pivoting armrest lid.

13. A method for covering a factory installed automotive center console armrest lid ("armrest lid"), the armrest lid having a shape, comprising:
   (a) cutting a piece of soft absorbent woven or knitted fabric and sewing the cut piece of fabric to form a fabric cover having a shape corresponding to the shape of the armrest lid and having a single opening, the single opening disposed at an open bottom area which creates a bottom edge;
   (b) attaching a piece of elastic or attaching a drawstring along the bottom edge of the fabric cover;
   (c) sewing a piece of material to a portion of a top surface of the fabric cover to form a pocket on the top surface of the fabric cover; and
   (d) installing the fabric cover to the armrest lid by positioning the open bottom area over the armrest lid and inserting an entire top surface of and side surfaces of the armrest lid through the open bottom area such that the entire top surface and side surfaces of the armrest lid are fully covered by the fabric cover and the fabric cover extends along a perimeter area of an underside surface of the armrest lid and the bottom edge of the fabric cover is fully and only positioned underneath the armrest lid and adjacent a bottom surface of the armrest lid.

14. The method of claim 13 further comprising the steps of providing elastic along the bottom edge in step (b) such that the elastic helps to maintain the fabric cover in place over the armrest lid.

15. The method of claim 13 further comprising the steps of providing a drawstring along the bottom edge in step (b) and pulling the drawstring tight to help maintain the fabric cover in place over the armrest lid.

16. The method of claim 13 wherein the armrest lid is a side opening/side pivoting armrest lid.

* * * * *